United States Patent
Ardis et al.

(10) Patent No.: US 10,229,369 B2
(45) Date of Patent: Mar. 12, 2019

(54) CREATING PREDICTIVE DAMAGE MODELS BY TRANSDUCTIVE TRANSFER LEARNING

(71) Applicant: General Electric Company, Schenectady, NY (US)

(72) Inventors: Paul Alex Ardis, Niskayuna, NY (US); Subhankar Ghosh, Karnataka (IN); Alexander Turner Graf, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 399 days.

(21) Appl. No.: 15/132,884

(22) Filed: Apr. 19, 2016

(65) Prior Publication Data
US 2017/0300605 A1    Oct. 19, 2017

(51) Int. Cl.
*G06N 99/00* (2010.01)
*G05B 23/02* (2006.01)
*G06K 9/62* (2006.01)

(52) U.S. Cl.
CPC ......... *G06N 99/005* (2013.01); *G05B 23/024* (2013.01); *G06K 9/6259* (2013.01)

(58) Field of Classification Search
None
See application file for complete search history.

(56) References Cited

U.S. PATENT DOCUMENTS

| 5,075,881 A | 12/1991 | Blomberg et al. |
| 7,428,478 B2 | 9/2008 | Aragones |

(Continued)

FOREIGN PATENT DOCUMENTS

JP   2011145846 A   7/2011

OTHER PUBLICATIONS

Mohammad Taha Bahadori, Learning with minimum supervision: A general framework for Transductive Transfer Learning, 2011, IEEE International Conference on Data Mining, pp. 61-70 (Year: 2011).*

Dai, Wenyuan "Boosting for Transfer Learning", Appearing in Proceedings of the 24th International Conference on Machine Learning, 2007, 8pgs.

(Continued)

*Primary Examiner* — Syed A Roni
(74) *Attorney, Agent, or Firm* — Buckley, Maschoff & Talwalkar LLC

(57) ABSTRACT

A method for creating predictive damage models includes receiving a first predictive damage model, identifying latent space between a first and a second domain asset, building a regression model from first domain asset projected source data, creating target dependent variables of a second model, applying classification or regression techniques to determine a function expressing the dependent variables, determining data points from the function to develop a second regression model, applying the second regression model to data points to predict target dependent variables, evaluating the second predictive damage model using the predicted target dependent variables, performing a sensitivity study to determine a directionality parameter of the second predictive damage model, and if the results are within an acceptable predetermined range, providing maintenance or servicing recommendations generated by the second predictive model to a user platform display, else repeating the process by rebuilding the regression model to further refine the regression model.

10 Claims, 4 Drawing Sheets

(56) References Cited

U.S. PATENT DOCUMENTS

| | | |
|---|---|---|
| 7,539,597 B2 | 5/2009 | Wegerich et al. |
| 7,702,435 B2 | 4/2010 | Pereira et al. |
| 8,600,917 B1 | 12/2013 | Schimert et al. |
| 8,856,052 B2 | 10/2014 | Chenthamarakshan et al. |
| 2011/0071965 A1* | 3/2011 | Long et al. |
| 2012/0041575 A1 | 2/2012 | Maeda et al. |
| 2014/0351642 A1 | 11/2014 | Bates et al. |

OTHER PUBLICATIONS

Suvorov, Mikhail et al. "Incremental Anomaly Identification by Adapted SVM Method", Neural Networks (IJCNN), The 2013 International Joint Conference on, Aug. 4-9, 2013, 7pgs.

Deng, Jun et al., "Linked Source and Target Domain Subspace Feature Transfer Learning—Exemplified by Speech Emotion Recognition", 2014 22nd International Conference on Pattern Recognition, 2014, DOI: 10.1109/ICPR.2014.141, (pp. 761-766, 6 total pages).

\* cited by examiner

CREATING PREDICTIVE DAMAGE MODELS BY TRANSDUCTIVE TRANSFER LEARNING

BACKGROUND

Predictive analytic models can be based on data extracted from a product's historical performance. A predictive model can predict trends and behavior patterns to create maintenance schedules that both improve the product's field reliability and minimize its downtime. To predict a future event, a predictive model can be based on past occurrences, component reliability, and/or engineering predictions.

It can be desirable to make assessment and/or predictions regarding the operation of a real world physical system, such as an electro-mechanical system—e.g., an aircraft turbine engine. The predictive model can be used to predict a condition of the system, or a portion of the system, to help make maintenance decisions, budget predictions, etc. Even with improvements in sensor and computer technologies, however, accurately making such assessments and/or predictions can be a difficult task.

A predictive model can include parameters and dimensions of the real-world physical system, which can be updated by historical maintenance records and/or data from sensors embedded in the system itself. A robust predictive model can consider multiple components of a system, each having its own micro-characteristics and not just average measures of a plurality of components associated with a production run or lot. Moreover, it may be possible to very accurately monitor and continually assess the health of individual components, predict their remaining lives, and consequently estimate the health and remaining useful lives of systems that employ them.

Mechanical systems wear or change over time, which affects the performance of these mechanical systems. Conventional predictive models can estimate the wear of a mechanical system. These models can be updated with information regarding the longevity of various components of the mechanical system using data collected over a system's life as input to statistical models. Theoretical models of the mechanical system which use physics or engineering information to build a model using test data. Such modeling is based on understanding how a system operates and progresses to a failure via knowledge, for example, of material properties and response to loading. However, conventional predictive models are confined to known systems and their component longevity.

DETAILED DESCRIPTION

Embodying systems and methods provide for creating predictive damage models by transductive transfer learning across domains (i.e., new asset types (e.g., engines, vehicles, etc.), on new aviation carriers, on expanded asset sets within the same type, on alternate flight condition expectations, etc.). Predictive models of distress or damage for aviation assets (or their components or subcomponents) are applied across domains by statistical learning of a functional difference(s) between the model's current domain and the new domain(s). The knowledge of these functional differences can be used to transform data from the new domain to equivalent points in the original (model construction) domain, thereby allowing for direct application of the model as if all data originated together. Conventional aviation damage models cannot be directly applied to data from other domains without a significant loss in accuracy and/or prediction effectiveness.

In accordance with embodiments, multiple methods can perform the statistical learning of functional differences between the data domains—including, but not limited to, dimensionality reduction (where a common lower-dimensional manifold can be estimated along with domain-to-manifold lossy transfer functions), and transfer adaptive boosting (where aggregate boosting of transfer function hypotheses can produce an ensemble estimate of a domain-to-domain function that aligns data distributions and minimizes error for known point correspondences). These methods allow for the direct application of existing models on transformed data without a significant loss of performance.

Embodying systems and methods can be used to develop predictive models for new products prior to the availability of a sufficient dataset for "from scratch" model development. Accordingly, the new products can benefit from effective service/maintenance schedules from their launch into the marketplace. Thus achieving better servicing, reliability, and also revenue for the entire asset performance period starting at its entry-into-service point. Additionally, predictive model development costs can be reduced by relying on existing predictive models to be updated to be applied to the new domain. Customized, per-carrier predictive models can be deployed rapidly, allowing for customized service to improve services, experience, and value.

Figure 1:
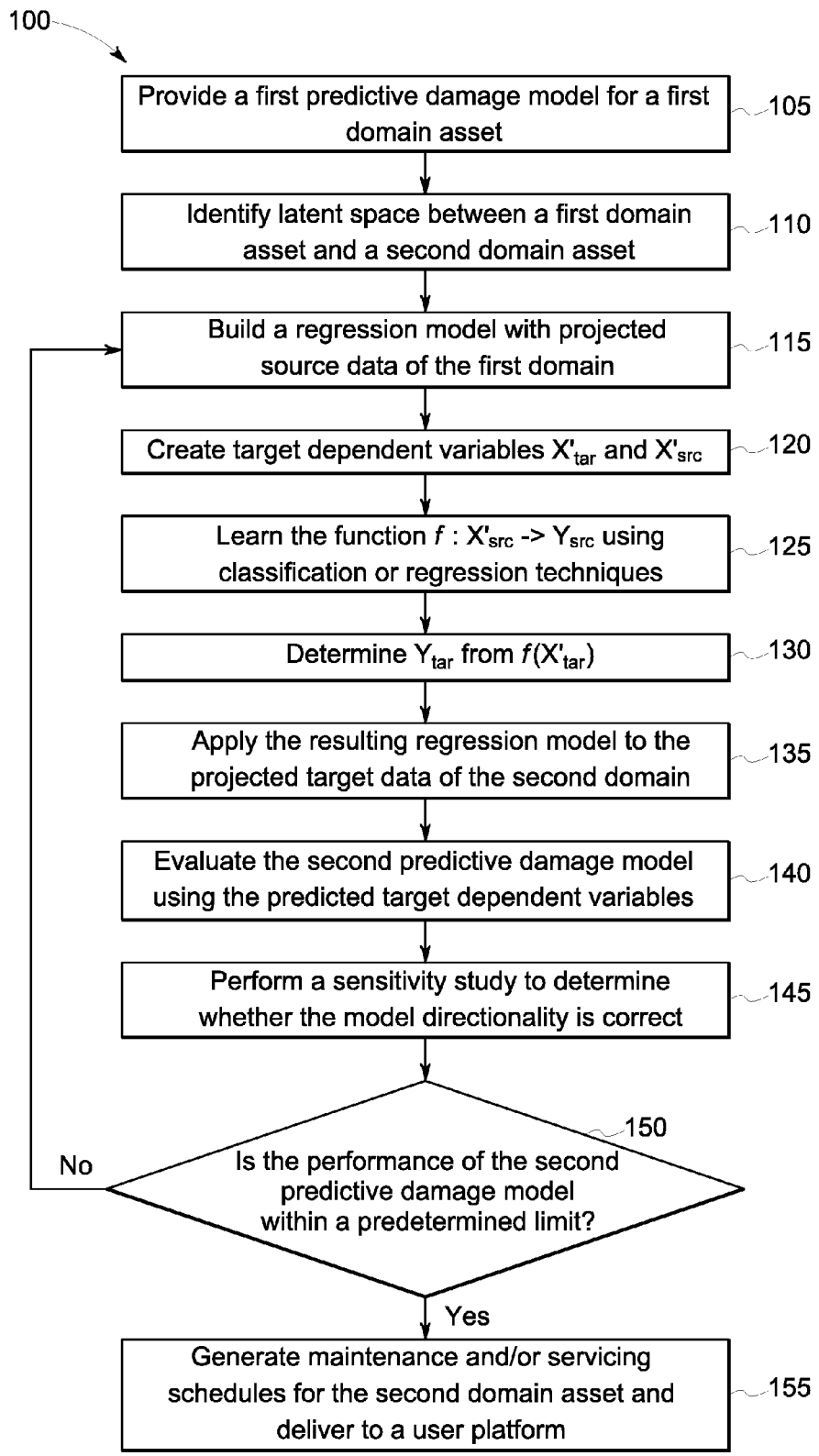
FIG. 1 depicts a process for creating predictive damage models in accordance with embodiments.

FIG. 1 depicts process 100 for creating predictive damage models in accordance with embodiments. Process 100 begins with a first predictive damage model which is operative to predict behavior(s) of a first, real-world physical asset (i.e., a first domain) being provided, step 105. Typically, the first predictive damage model is for an already existing domain. However, the invention is not so limited. Process 100 can be implemented from a first predictive damage model for a yet-to-be realized second domain asset so long as the predictive capabilities of the first predictive damage model are within acceptable limits. Process 100 creates a second predictive damage model operative to predict behavior(s) of a second, real-world physical asset (i.e., a second domain) through transductive transfer learning using knowledge of the first domain and of the second domain.

At step 110, latent space between the first domain asset and the second domain asset is identified. In accordance with some implementations, the latent space can be identified by solving a semidefinite programming (SDP) problem to optimize a user-specified function. The solution to the SDP problem can provide a latent universal kernel between the two domains. This latent space highlights the similarities between the two domains and is used as a bridge from the first predictive model to the second predictive model using knowledge transfer.

A regression model is built, step 115, with projected source data of the first domain. In accordance with some implementations, the regression model can apply a principal component analysis (PCA) to the latent space kernel. The PCA analysis results in vectors of an uncorrelated orthogonal basis set. The principal components are orthogonal because they are the eigenvectors of the symmetric covariance matrix.

Using the top k eigenvectors of the PCA analysis as a basis, $x'_{tar}$ and $x'_{src}$ are created, step 120. Standard classification or regression techniques can be used to learn, step 125, the function $f: x'_{src} \rightarrow y_{src}$. Knowing the function, $f(x'_{tar})$ can be used to determine, step 130, $y_{tar}$. The resulting regression model is applied, step 135, directly to projected target data of the second domain. Applying the regression model to projected target data can predict target dependent variable(s).

The predicted target dependent variables are used to evaluate, step 140, the performance of the second predictive damage model. Because the dependent variables in the final regression model are not intuitive, a sensitivity study is performed, step 145. The sensitivity study is performed to determine whether the model directionality is correct, and that it does not diverge. Results of studies have demonstrated that population shift post-transformation is minimal regardless of perturbation, which suggests a high tool robustness to input noise for the second predictive damage model created by transductive transfer learning in accordance with embodiments.

Figure 2A:
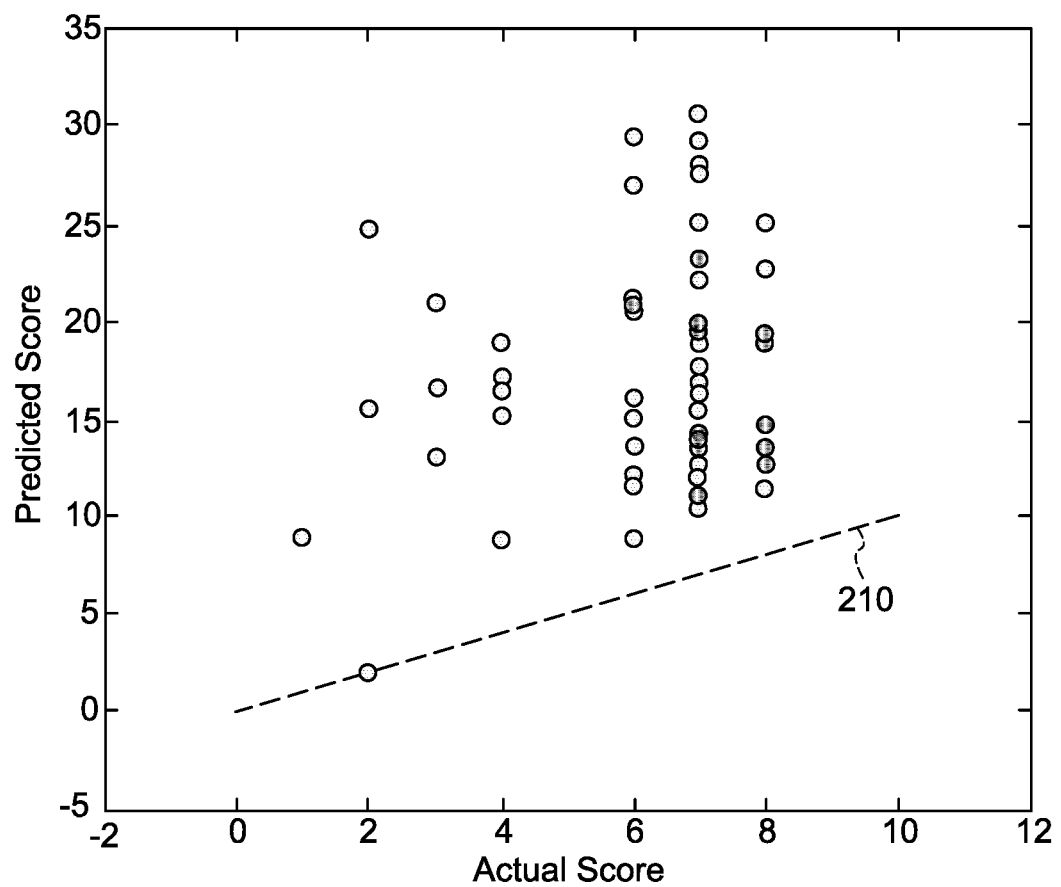
FIGS. 2A-2B depict predictive model performances in accordance with embodiments.
Figure 2B:
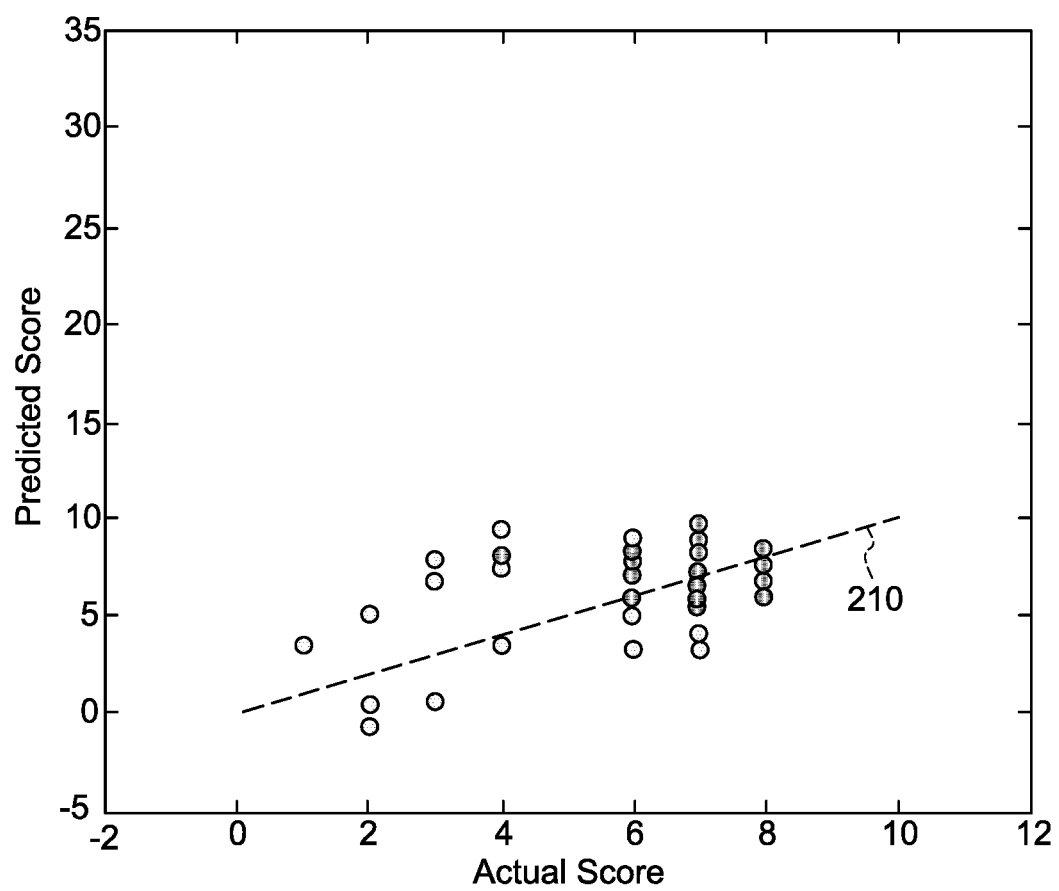

FIG. 2A graphically depicts the performance of a first predictive damage model for a first domain when it is applied directly as a predictive model for a second domain. FIG. 2A illustrates that the first predictive damage model results in predictions well distant from a perfect performance line 210 of an ideal predictive model. FIG. 2B graphically depicts the performance of a second predictive damage model created for a second domain from the first predictive model by transductive transfer learning in accordance with embodiments. As illustrated in FIG. 2B, the performance of the second predictive damage model straddles the perfect performance ideal 210 with acceptable residual errors (e.g., root mean square error (RMSE) of about 2.1).

With continued reference to FIG. 1, the results of the sensitivity study are evaluated, step 150, to determine if the performance of the second predictive damage model (created by transductive transfer learning) are within a predetermined acceptable limit. If the sensitivity study results are outside the acceptable limit, process 100 returns to step 115 to build a further-refined regression model. The further-refined regression model can be progressively retuned by comparing residual root mean square errors against a few known labels in the new domain. If the sensitivity study results are within the acceptable limit, maintenance and/or servicing schedules for the new second domain asset are generated, step 155. These maintenance and/or servicing schedules are delivered to a user platform for access by users.

Figure 3:
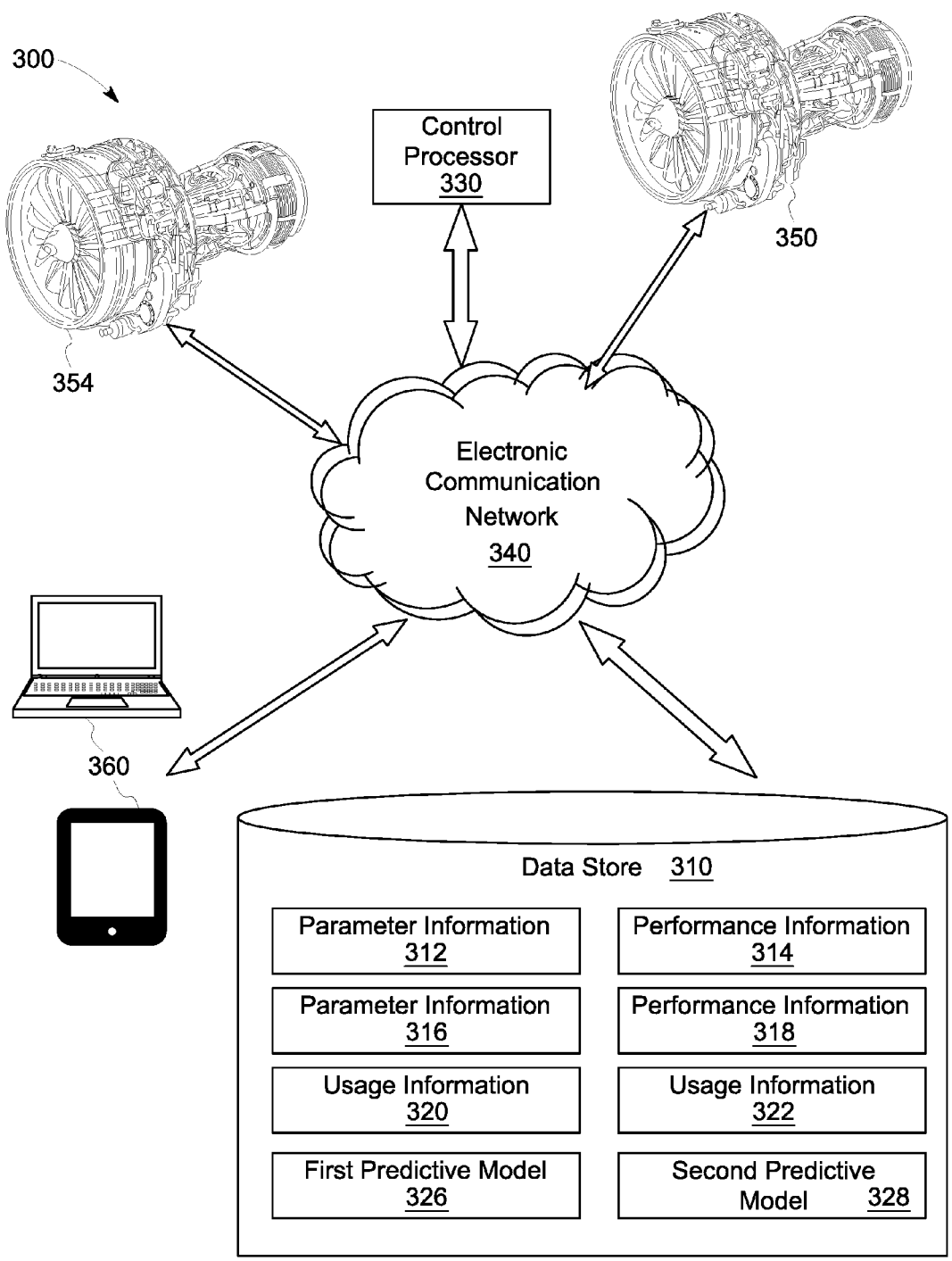
FIG. 3 depicts a high-level architecture of an exemplary system in accordance with embodiments.

FIG. 3 is a high-level architecture of system 300 in accordance with some embodiments. System 300 includes a computer data store 310 that includes parameter information 312, and performance information 314 related to first domain asset 350 (e.g., a turbine engine). The data store can also include parameter information 316, and performance information 318 related to second domain asset 354. Usage information 320, 322 in the data store can include, for example, engine sensor information, exhaust gas temperatures, fuel combustion rates, component reliability predictions, etc. The usage information related to the first domain asset can be both calculated, and real-world observances obtained from manual examination of first domain asset(s).

First predictive model 326 can be resident in the data store, and include instructions that can cause control processor 330 to create a prediction and/or result that may be transmitted to various user platforms 360 as appropriate (e.g., for display to a user). Second predictive damage model 328 can be located in the data store after it is generated in accordance with process 100. The components of system 300 can be located locally to each other, or remotely, or a combination thereof. Communication between the system components can be over electronic communication network 340.

The electronic communication network can be an internal bus, or one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The prediction model(s), and system 300 itself, can store information into and/or retrieve information from various data sources, such as the computer data store 310 and/or user platforms 360. The various data sources may be locally stored or reside remote from system 300. A user may access system 300 via one of the user platforms 360 (e.g., a personal computer, tablet, smartphone, etc.).

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as creating predictive damage models by transductive transfer learning across domains, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for creating predictive damage models, the method comprising:

receiving an existing first predictive damage model configured to generate at least one of maintenance and servicing recommendations for an existing asset of a first domain;

updating the first predictive damage model to a second predictive damage model, the second predictive damage model applicable to an asset of a second domain, and the second domain having a difference from the first domain;

updating the first predictive damage model including:

identifying latent space between the first domain asset and the second domain asset;

building a regression model from projected source data of the first domain asset;

creating target dependent variables of the second predictive damage model;

applying one of classification and regression techniques to determine a function expressing the target dependent variables;

determining a set of data points from the determined function to develop a second regression model;

applying the second regression model to the set of data points to predict target dependent variables for the second predictive damage model;

evaluating the second predictive damage model using the predicted target dependent variables;

performing a sensitivity study to determine whether a directionality parameter of the second predictive damage model is correct;

based on determining the results of the evaluating step are within an acceptable predetermined range, providing maintenance or servicing recommendations generated by the second predictive damage model to a user platform display; and based on determining the results of the evaluating step are outside the acceptable predetermined range, repeating the process by rebuilding the regression model to further refine the regression model.

2. The method of claim 1, the identifying latent space including optimizing a user-specified function by solving a semidefinite programming problem.

3. The method of claim 1, including using the identified latent space to bridge from the first predictive damage model to a second predictive damage model.

4. The method of claim 1, including applying principal component analysis to the identified latent space.

5. The method of claim 1, the rebuilding the regression model including retuning the regression model by comparing residual root mean square errors against known labels of the second domain asset.

6. A non-transitory computer readable medium containing computer-readable instructions stored therein for causing a computer processor to create a predictive damage models comprising:

receiving an existing first predictive damage model configured to generate at least one of maintenance and servicing recommendations for an existing asset of a first domain;

updating the first predictive damage model to a second predictive damage model, the second predictive damage model applicable to an asset of a second domain, and the second domain having a difference from the first domain;

updating the first predictive damage model including:

identifying latent space between the first domain asset and the second domain asset;

building a regression model from projected source data of the first domain asset;

creating target dependent variables of the second predictive damage model;

applying one of classification and regression techniques to determine a function expressing the target dependent variables;

determining a set of data points from the determined function to develop a second regression model;

applying the second regression model to the set of data points to predict target dependent variables for the second predictive damage model;

evaluating the second predictive damage model using the predicted target dependent variables;

performing a sensitivity study to determine whether a directionality parameter of the second predictive damage model is correct; and if the results of the evaluating step are within an acceptable predetermined range, providing maintenance or servicing recommendations generated by the second predictive damage model to a user platform display;

else repeating the process by rebuilding the regression model to further refine the regression model.

7. The non-transitory computer-readable medium of claim 6, including instructions to cause the processor to perform the identifying latent space by optimizing a user-specified function by solving a semidefinite programming problem.

8. The non-transitory computer-readable medium of claim 6, including instructions to cause the processor to perform a step of using the identified latent space to bridge from the first predictive damage model to a second predictive damage model.

9. The non-transitory computer-readable medium of claim 6, including instructions to cause the processor to perform a step of applying principal component analysis to the identified latent space.

10. The non-transitory computer-readable medium of claim 6, including instructions to cause the processor to include in rebuilding the regression model a step of retuning the regression model by comparing residual root mean square errors against known labels of the second domain asset.

* * * * *